United States Patent [19]

Hedges et al.

[11] 3,917,814

[45] Nov. 4, 1975

[54] INSECTICIDAL COMPOSITION AND METHOD OF PREPARING THE SAME

[76] Inventors: Kenneth B. Hedges, 27128 Freeport Road, Palos Verdes Peninsula, Calif. 90274; William R. Belford, P.O. Box 1323, Torrance, Calif. 90505

[22] Filed: Dec. 13, 1971

[21] Appl. No.: 207,528

Related U.S. Application Data

[63] Continuation-in-part of Ser. No. 872,404, Oct. 29, 1969, abandoned, and a continuation-in-part of Ser. No. 522,831, Jan. 25, 1966, abandoned.

[52] U.S. Cl. ................. 424/23; 117/123; 117/169; 424/357
[51] Int. Cl. ......................... A01n 9/00; A61k 9/00
[58] Field of Search ....... 424/23, 357; 117/123, 169

[56] References Cited
UNITED STATES PATENTS

| | | | |
|---|---|---|---|
| 1,617,708 | 2/1927 | Gehauf et al. | 424/357 X |
| 2,777,795 | 1/1957 | LesVeaux et al. | 424/357 X |
| 3,028,305 | 4/1962 | Alvin et al. | 424/357 X |
| 3,274,052 | 9/1966 | Yaffe et al. | 424/357 X |

OTHER PUBLICATIONS

Bartlett J. Econ. Entomol., 44(6):891–896 Dec. 1951.
Ebeling et al. J. Econ. Entomol., 52(2):190–207 Apr. 1959.
Wagner et al. J. Econ. Entomol., 52(2):208–212 Apr. 1959.
Tarshis Pest. Control, 27(6):14,16–18,20,22,24,-26–28,30,32 June 1959.
Micks J. Econ. Entomol., 53(5):915–918 Oct. 1960.
Watters J. Econ. Entomol., 59(11:146–149 Feb. 1966.
Key U.S.D.I. Bu. Mines Circular, 8260 7pp. (1965).
Cotton et al. J. Econ, Entomol., 42:553(1949).

*Primary Examiner*—Shep K. Rose
*Attorney, Agent, or Firm*—Lyon & Lyon

[57] ABSTRACT

A non-poisonous insecticidal composition is disclosed in which inorganic particles such as diatomaceous earth have a sorptive silica gel adhered to the surface thereof. The insecticidal composition is preferably produced by forming the sorptive silica gel in situ in the presence of such inorganic particles.

9 Claims, No Drawings

INSECTICIDAL COMPOSITION AND METHOD OF PREPARING THE SAME

This application is a continuation-in-part of co-pending application, Ser. No. 872,404, filed Oct. 29, 1969, and application, Ser. No. 522,831, filed Jan. 25, 1966, both now abandoned.

Insecticides can be generally classified as (1) chemical poisons and (2) non-poisons. The chemical poisons kill by entering into the metabolism of an insect and are in general quite effective. It is well recognized however that such poisonous insecticides present toxicity problems, which, in many cases, have severely limited or precluded their use.

Such toxicity problems have tended to accelerate the development of non-poisonous insecticides. Sorptive dusts have shown particular promise for use as non-poisonous insecticides. Among such materials are various sorptive inorganic materials including synthetic silicas, tricalcium phosphate, diatomaceous earths, bentonites, kaolinite clays, activated carbons, silica aerogels and the like. The effectiveness of such materials as insecticides, since they are not poisonous, relates to the anatomical structure of the insects.

Many common insects have on their bodies a so-called "lipid" layer, which is usually of submicron thickness and is composed of a wax or grease like composition roughly analogous to the composition of common beeswax. The lipid layer on an insect is usually found in conjunction with other layers in the epicuticle of the insect and serves to retain moisture within the insect's body. This type of structure is most commonly found in various arthropods.

Sorptive dusts are believed to function as insecticides by removing or disrupting in some way as by absorption, adsorption or abrasion the lipid layer, thus permitting moisture to escape from the principal part of an insect's body. Upon such loss of moisture, an insect will normally die.

Many of the sorptive dust type materials indicated in the preceding discussion are not effective enough as insecticides to justify their utilization. Certain other of these materials are objectionable for use in certain applications for other reasons such as, for example, because they lower the value of grain containing them. As a result of these considerations and related factors, silica aerogel type insecticides are considered to be among the most promising of the sorptive dust insecticides. Insecticides of this type, however, suffer from certain limitations. In general they are too light in weight to be satisfactorily employed in other than enclosed structures. They also tend to be too expensive for many applications.

An object of the present invention, therefore, is to provide new and improved compositions serving as sorptive type, non-poisonous insecticides which are more effective than prior related insecticides.

Another object of the present invention is to provide sorptive type insecticidal compositions which may be easily and conveniently manufactured at a comparatively nominal cost.

A further object of the present invention is to provide compositions which may be used easily and conveniently without significant danger.

These and various other objects of this invention will become apparent from a reading of the following more detailed description of the invention.

It can be stated in essentially summary form that the present invention evolves about the discovery that inorganic particles may be coated with an adherent coating of a sorptive silica gel composition, especially hydrogels, and that the particles thus coated are highly effective as insecticides. As will be described more completely, the particles used preferably should have a sorptive surface, that is the particles themselves should be of a sorptive character. Also, for many uses, a compound such as ammonium silico fluoride is preferably included, which is considered to aid in attracting and/or holding the particles to naturally occurring objects including plants and insects.

The preferred particles for use with the present invention are diatomaceous earth (diatomite), since it has been found that such particles are quite effective and also are of comparatively low cost and are readily available. However, various other sorptive materials may be used, including various bentonites, sub-bentonites, montmorillonites, pyrophyllite, fuller's earths, silica flour, carbon, perlite, and other natural or synthetic substantial equivalents.

The size of the inorganic particles can be varied to a considerable extent, although the size of the particles is important with regard to the ease with which the insecticide can be distributed. In general, the smaller the particles the easier it is to distribute the particles to an operative or intended location as long as size of the particle is sufficiently great that the particles cannot, because of their low weight, be blown about indiscriminately as dust in the air on a normal or "quiet" day. Thus, the particles should be sufficiently large and/or heavy so that they are capable of settling from "normal" or reasonably quiet air, that is at least about 400 mesh (Tyler screen size) or greater. Because the particles must, however, be sufficiently fine so that they can be easily distributed, they should pass a 100 mesh standard Tyler screen and preferably all or substantially all pass a 200 mesh standard Tyler screen.

In a composition of this invention, the inorganic particles are coated with an adherent coating of a silica gel, normally a hydrogel. Silica aerogels and hydrogels are well known and are used for many purposes such as in the paper and protective coating fields. These aerogels and hydrogels are considred to be highly absorbent for various materials such as water, oils, waxes, and the like. In general, hydrogels tend to be more absorbent toward water and various compositions which are similar to water than aerogels. Conversely, aerogels tend to absorb waxes and various other related compounds characterized by having comparatively long aliphatic hydrocarbon chains to a greater extent than the hydrogels. It is to be noted, however, that the sorptive characteristics of a hydrogel may be changed by various known expedients so as to produce properties which tend to approximate the sorptive properties of an aerogel.

The thickness of the silica gel coating on the inorganic particles may be varied considerably and may be either a continuous or discontinuous coating, that is, the inorganic particles may or may not be completely coated. The surface of the inorganic particles must have sufficient silica gel coated thereon, however, to impart the necessary sorptive insecticidal properties to the composition. Since the lipid layer of insects is very thin, only a small amount of sorptive silica gel is necessary to kill the insects, and hence only a small quantity of silica gel coating on the inorganic particles is necessary. In general, the silica gel coating will be at least 0.1 percent by weight of the total weight of the coated particles, and preferably at least about 0.2 percent. Insofar as the effectiveness of the insecticidal composition is concerned, there does not appear to be an upper limit on the quantity of the silica gel coating. For economical reasons, however, the quantity of such coating will be kept to a minimum, generally not exceeding approximately 10 percent by weight of the total weight of the coated particles.

It should also be noted that the silica gel coated inorganic particles, of course, are applied in powder form as a batch or dosage of the finely divided coated particles rather than as single particles. Consequently, it is not essential that every particle in such batch have the same quantity of silica gel coating, as it is the effect of the total batch which is significant. In other words, the total batch must contain a sufficient quantity of the sorptive silica gel to provide the necessary insecticidal properties rather than the individual particles. Accordingly, based on the total weight of such a batch, the sorptive silica gel should comprise at least about 0.1 percent by weight and preferably at least 0.2 percent. In this regard, it should also be noted that in some instances, since the insecticidal composition is preferably produced by coating the inorganic particles by in situ formation of the gel about the particles followed by comminution to provide a composition of reduced particle size, some individual particles of the composition may contain little or no silica gel coating. Since the coated particles are used as a batch, however, this will not affect the effectiveness of the composition as an insecticide, so long as the composition as a whole contains the indicated minimum quantity of sorptive silica gel.

The composition of coated particles, for effective results, will normally have a packed bulk density of about 15 to about 100 pounds/cubic foot, preferably about 20 to about 30 pounds/cubic foot, since the composition may be used in unenclosed areas where the effect of wind must be taken into consideration. The packed bulk density, as is well understood by persons skilled in the art, is the weight/unit volume of the powder when packed in a standard cubic foot container and may be determined simply by filling such a container with the powder and weighing the same.

It has been found that the sorptive silica gel should be intimately adhered to the inorganic particles as a coating rather than in the form of a mixture of the aerogel or hydrogel and such particles since the degree of adherence produced by mixing is not sufficient because the silica gel and the inorganic particles may be readily separated as, for example, in handling. Further, for reasons which are not clear, the insecticide is not as effective as when a direct, intimate bond is achieved between the silica gel and the inorganic particles.

Satisfactory direct coating of the silica gel on the inorganic particles in situ, which is generally a preferred method of making the insecticidal composition, can be achieved by mixing the inorganic particles with a soluble silicate composition in the preparation of silica gel as such a gel is being formed. Such gels may be manufactured by various methods, as indicated in U.S. Pat. Nos. 1,755,496, 2,330,640, 2,625,592, 2,475,253 and 2,477,695, which are incorporated by reference herein.

From a study of these references it will be seen that hydrogels are frequently manufactured by treating a solution of a soluble silica compound such as common water glass with a reagent such as sulphuric acid which changes the pH of the composition and causes it to set up as a gel. The particles used in creating an insecticide composition of this invention can be added to such a mixture before or as the reagent or reagents necessary to cause gelation are being added to the soluble silicate.

In the production of conventional hydrogels, the gel resulting from the mixture of various materials is normally dried and comminuted to a desired size. In the production of an insecticide compositon of this invention using hydrogel coatings, the inorganic particles with the gel coating thereon are also normally dried and comminuted. In general, these steps are carried out as in the conventional manufacture of hydrogels, drying at a temperature of from 250° to 350°F until completely dry, and then comminuting to disintegrate the particles and produce finely divided, discrete coated particles having dimensions corresponding to the dimensions of the uncoated particles employed, i.e., within the range of about 100 to about 400 mesh Tyler screen size.

During the manufacture of the insecticide composition, various secondary type reagents can be added to the reaction mixture, either before a gel forms or at various stages during the process of preparing the silica gel coated particles. Thus, for example in accordance with known procedures, compounds such as potassium fluoride or the like may be added to the reaction mixture forming a silica gel in order to increase the pore size of the resultant product.

If desired, the character of the gel prepared in accordance with this invention may be altered in other ways. Compounds which are related to soluble silica compounds such as sodium aluminate may be added to or mixed with silica compounds during the formation of an insecticidal composition of this invention.

As indicated previously, it is generally preferred to use ammonium silico fluoride to give the final composition an electrostatic attraction towards natural objects such as plants, leaves, etc. and insects to aid in air dispersion. The ammonium silico fluoride can be added to and mixed with the inorganic particles coated with the sorptive silica compound after drying and comminuting. When this is done, the resultant mixture is dried at a temperature below about 250°F, which is believed to cause a reaction between the silica gel and the ammonium silico fluoride to form an electrostatic charge on the surfaces present. However, more favorable results are considered to be achieved by adding ammonium silico fluoride as a wet solution to the gel prior to its being dried by contacting the gel with an aqueous solution of this compound. In this case, the gel should be dried at a temperature about 200° to about 1200°F in a closed container, venting the water vapor to the atmosphere, and maintaining the ammonium silico fluoride in contact with the coated particle until the temperature is below about 250°F.

As indicated above, it is believed that the ammonium silico fluoride reacts in some manner with the sorptive silica gel to provide the desired electrostatic properties to the particles. Ammonium silico fluoride sublimes at about 250°F and consequently its presence may not be measurable in the resulting product. Nevertheless, the use of such material in production of the insecticidal composition is beneficial and in general, it should be used in a quantity of at least about 5 percent by weight, based on the weight of the sorptive silica gel.

The invention will be better understood by reference to the following specific illustrative examples.

In all of the following examples, the diatomaceous earth which was used as the inorganic particles was a natural dried and ground diatomaceous earth, 95 percent by weight of which passed a 325 mesh standard Tyler screen, having a surface area of 25 sq. meters per gram. For comparative purposes, a sample of the sorptive silica gel referred to in each of the examples was also made by the identical procedure indicated, omitting, however, the inorganic particles.

In each of the examples, the identical procedure was used. The various materials used in forming the gel were mixed together, allowed to gel or set, washed with water until about 80 percent of the sodium ion was removed, and then dried and comminuted. Unless otherwise indicated, in each of these examples the product was ground to −325 mesh standard Tyler size, and in all cases after grinding, the composition contained at least about 0.1 weight percent of the sorptive silica gel.

EXAMPLE 1

46 gms diatomaceous earth, 75 ml. of 40° Be sodium silicate, 1500 ml. water and 25 ml. of a 30 percent by weight aqueous solution of $H_2SiF_6$ were mixed and then allowed to set for 30 minutes. At the end of this period, 125 ml. of a 10 percent by weight aqueous ammonia was added. At the end of 30 minutes, the resultant product was washed and filtered. To one-half of this product, 0.5 gm ammonium silico fluoride was added. The part of the product to which this compound was added was then dried at 600°F in a substantially closed container venting the moisture to the atmosphere, and ground. The resultant product contained 61.0 percent by weight diatomaceous earth, with the other 39.0 percent, of course, being the sorptive silica gel.

EXAMPLE 2

The same procedure and quantities used in the preceding Example 1 were employed except potassium silicate was substituted for sodium silicate. The resultant product contained 61.0 percent by weight diatomaceous earth with the balance being the sorptive silica.

EXAMPLE 3

50 gms of expanded perlite finely ground to 95 percent by weight −325 mesh size having a surface area of 20 sq. meters per gram were mixed with 200 ml. water, 50 ml. of an aqueous sodium silicate solution having a specific gravity of 1.21, 19 ml. of 4.83 N. KF, and 10 ml. 1.19 specific gravity sulfuric acid. The resultant mixture was allowed to gel, then washed and filtered. This product was then dried at 600°F and then ground. The resultant product contained 83 percent by weight perlite, the balance being sorptive silica gel.

EXAMPLE 4

50 gms. diatomaceous earth, 200 ml. water, 12.5 ml. 1.21 specific gravity aqueous sodium silicate solution, 5 ml. 4.83 N.KF, and 5 ml. 1.19 specific gravity sulfuric acid were mixed. After the mixture gelled it was washed and filtered, and 2 gm. ammonium silico fluoride was added. The resultant product was dried and then ground. The resultant product contained 95 percent by weight diatomaceous earth with the additional 2 percent being sorptive silica.

EXAMPLE 5

50 gms diatomaceous earth, 200 ml. water, 25 ml. 1.21 specific gravity aqueous sodium silicate solution, 10 ml. 4.83 N. KF and 10 ml. 1.19 specific gravity sulfuric acid were mixed. After a gel formed, the resultant product was washed and filtered. 2 grams of ammonium silico fluoride were then added. The product was then dried at 600°F as in Example —1 and then ground. The resultant product contained 91 percent by weight diatomaceous earth, and the balance, of course, was the sorptive silica gel.

EXAMPLE 6

50 gms. diatomaceous earth, 100 ml. water, 50 ml. 1.21 specific gravity aqueous sodium silicate solution, 19 ml. 4.83 N. KF and 50 ml. 1.19 specific gravity sulfuric acid were mixed. After the mixture gelled, it was washed and filtered and 1.3 gm. of ammonium silico fluoride was added. The resultant product was next dried at a temperature of 600°F as in Example 1 and then ground. The resultant product contained 83 percent by weight diatomaceous earth with the balance being silica gel.

EXAMPLE 7

50 gms. diatomaceous earth, 200 ml. water, 100 ml. 1.21 specific gravity aqueous sodium silicate solution, 38 ml. 4.83 N. KF and 100 ml. 1.19 specific gravity sulfuric acid were mixed. After a period of 15 minutes, the product was washed and filtered and 2 gm. of ammonium silico fluoride was added. Then the resultant product contained 71 percent by weight diatomaceous earth with the balance being sorptive silica gel.

EXAMPLE 8

The procedure specified in Example 6 was followed except the product was dried at 800°F instead of at the temperature indicated. The resultant product contained 83 percent diatomaceous earth and 17 percent of silica gel.

EXAMPLE 9

The prodecure indicated in Example 6 was followed, but the product was dried at 350°F instead of the temperature indicated. The resultant product contained 83 percent diatomaceous earth and 17 percent ammonium silico fluoride.

EXAMPLE 10

The procedure indicated in Example 6 was followed, omitting the addition of ammonium silico fluoride. The resultant product contained 83 percent diatomaceous earth and 17 percent sorptive silica gel.

In order to demonstrate the effectiveness of the products obtained in accordance with the preceding examples, a series of tests were run using the insecticide compositions of the preceding examples. Tests were simultaneously run utilizing as insecticides the diatomaceous earth and perlite used in the preceding examples and a commercial preparation sold as Dri-Die 67 by the Davison Chemical Company of Baltimore, Md. This Dri-Die composition is understood to be a silica aerogel. Also, mixtures of the diatomaceous earth or perlite used in the examples and gels produced in accordance with Examples 1–7 (omitting the inorganic particles) were made and tested along with the insecticide compositions of the examples. The physical mixture of these compositions was accomplished by mechanical blending.

In all tests, one-half cc of the insecticidal material being tested was sprinkled as evenly as possible onto the bottom of a 50 ml. glass beaker. 10 test insects were then placed on the bottom of each beaker and inspected at periodic intervals. The test insects were *Tribolium confusum Duval*. In the examples, these beetles were recorded as dead when there was a total apparent lack of physical movement of appendages and/or antennae at the time of inspection. In order to guard against various factors of an extraneous variey influencing the tests, three beakers were used in all tests. The tests were carried out at 50 and 80 percent relative humidity and at a temperature of 80°F.

The following table indicates the results of these tests.

variety. It is well established that significant quantities of particles such as diatomaceous earth do not harm warm-blooded animals including humans. It is also well established that silica hydrogels and aerogels are of a similar character. Although no formal toxicity studies are known by us with respect to ammonium silico fluoride, this compound has been previously used in insecticides, and we are not aware of any published reports indicating that it possesses any significant degree of toxicity when used in minor quantities.

It is, of course, to be understood that different inorganic particles and sorptive silica compounds could be used in the preceding examples. Similarly, other insects could have been used. For the sake of brevity of disclosure, however, such examples are not duplicated herein since the utility and significant contribution of the invention have been demonstrated.

| Test No. | Insecticidal Material | Test at 80°F 50% R. H. Mortality at 30 Hrs. (Number of Insects) Beaker | | | Test at 80° F, 80% R. H. | | | | | | | | | | | |
|---|---|---|---|---|---|---|---|---|---|---|---|---|---|---|---|---|
| | | | | | Mortality at 24 Hrs. (Number of Insects) Beaker | | | Mortality at 42 Hrs. (Number of Insects) Beaker | | | Mortality at 65 Hrs. (Number of Insects) Beaker | | | Mortality at 6 Days (Number of Insects) Beaker | | |
| | | a | b | c | a | b | c | a | b | c | a | b | c | a | b | c |
| 1 | Diatomaceous earth | 6 | 6 | 1 | 0 | 0 | 0 | 0 | 0 | 0 | 0 | 0 | 0 | 5 | 6 | 2 |
| 2 | Perlite | 0 | 0 | 2 | 0 | 0 | 0 | 0 | 0 | 0 | 0 | 0 | 0 | 1 | 2 | 4 |
| 3 | Dri-Die 67 | 10 | 7 | 10 | 10 | 10 | 10 | | | | | | | | | |
| 4 | Example 1 | 10 | 10 | 10 | 10 | 9 | 10 | 10 | 10 | 10 | | | | | | |
| 5 | Mixture 94.5% by wt. Diatom Earth, bal. gel Ex. 1 | 3 | 4 | 6 | 0 | 0 | 0 | 1 | 0 | 0 | 4 | 0 | 2 | 7 | 6 | 9 |
| 6 | Example 2 | 10 | 10 | 10 | 9 | 2 | 9 | 10 | 7 | 10 | 10 | 10 | 10 | | | |
| 7 | Mixture 94.5% by wt. Diatom Earth, bal. gel Ex. 2 | 5 | 5 | 5 | 1 | 0 | 0 | 1 | 0 | 0 | 1 | 1 | 0 | 9 | 6 | 7 |
| 8 | Example 3 | 10 | 10 | 10 | 5 | 8 | 9 | 10 | 10 | 10 | | | | | | |
| 9 | Mixture 92% by wt. perlite, bal. gel from Ex. 3 | 1 | 7 | 7 | 0 | 0 | 0 | 0 | 0 | 0 | 0 | 0 | 0 | 3 | 5 | 5 |
| 10 | Example 4 | 10 | 9 | 10 | 7 | 10 | 10 | 10 | 10 | 10 | | | | | | |
| 11 | Mixture 98% by wt. Diatom. Earth, bal. gel from Ex. 4 | 4 | 8 | 8 | 0 | 0 | 0 | 0 | 4 | 0 | 0 | 7 | 1 | 9 | 7 | 8 |
| 12 | Example 5 | 10 | 10 | 9 | 10 | 8 | 9 | 10 | 9 | 10 | 10 | 10 | 10 | | | |
| 13 | Mixture 96% by wt. Diatom. Earth, bal. gel from Ex. 5 | 2 | 3 | 2 | 0 | 0 | 0 | 0 | 0 | 0 | 0 | 0 | 0 | 8 | 9 | 10 |
| 14 | Example 6 | 8 | 2 | 10 | 3 | 0 | 1 | 5 | 1 | 2 | 8 | 5 | 9 | 10 | 10 | 10 |
| 15 | Mixture 92% wt. Diatom. Earth, bal. gel from Ex. 6 | 4 | 6 | 6 | 0 | 0 | 0 | 0 | 0 | 0 | 1 | 0 | 3 | 9 | 8 | 10 |
| 16 | Example 7 | 10 | 10 | 10 | 10 | 10 | 10 | | | | | | | | | |
| 17 | Mixture 84% by wt. Diatom. Earth, bal. gel from Ex.7 | 10 | 9 | 9 | 0 | 0 | 0 | 1 | 0 | 3 | 5 | 4 | 6 | 10 | 10 | 9 |
| 18 | Example 8 | 10 | 10 | 10 | 10 | 10 | 10 | | | | | | | | | |
| 19 | Example 9 | 10 | 10 | 10 | 10 | 10 | 9 | 10 | 10 | 10 | | | | | | |
| 20 | Example 10 | 10 | 10 | 10 | 10 | 10 | 10 | | | | | | | | | |

From this table, it will be seen that the insecticide compositions of this invention are effective for their intended purpose, even at high relative humidity. It will also be apparent that the insecticide compositions of this invention are much more effective than mere mixtures of the inorganic particles and silica gels. This is considered to be significant and to evidence the presence of a synergistic effect with the insecticides of this invention.

It should also be noted that the insecticide compositions of this invention are comparatively "heavy" as compared to previously known sorptive silica compositions and, when ammonium silico fluoride is used, are attracted to "natural" objects such as plants or insects so as to be capable of being used in cropdusting or the like. This is considered to be extremely significant. Prior related compositions such as the aerogel composition referred to in the table are of such a light and "fluffy" nature that they cannot be employed commercially for such purposes.

It is also significant that the insecticide compositions of the present invention are of an essentially non-toxic From the foregoing it will be apparent that the insecticides of this invention are non-poisonous, relatively inexpensive, and effective. It will be apparent that these compositions may be easily and conveniently used in the same manner as other sorptive dust insecticides for a wide variety of diverse applications. It will also be apparent that the insecticide compositions of this invention may be manufactured without significant difficulty at a comparatively moderate cost.

We claim:

1. A non-poisonous insecticidal powdered composition useful as a sorptive dust insecticide, effective on contact with the insect's waxy epicute, comprising inorganic sorptive particles within the range of from about 100 to about 400 mesh Tyler screen size and having adhered to the surface thereof a sorptive silica gel, said silica gel constituting at least about 0.1 percent by weight of the total weight of the coated particles and said composition having a packed bulk density from about 15 to about 100 lbs/feet$^3$.

2. A non-poisonous insecticidal powdered composition useful as a sorptive dust insecticide, effective on contact with the insect's waxy epicute comprising inorganic sorptive particles within the range of from about 100 to about 400 mesh Tyler screen size and selected from the group consisting of diatomaceous earth, bentonites, sub-bentonites, montmorillonites, pyrophyllite, fuller's earth, silica flour, carbon and perlite and having adhered to the surface thereof a sorptive silica gel, said silica gel ranging from about 0.1 to about 10 percent by weight of the total weight of the coated particles and said composition having a packed bulk density from about 15 to about 100 lbs/feet$^3$.

3. A non-poisonous insecticidal powdered composition useful as a sorptive dust insecticide, effective on contact with the insect waxy epicute, comprising inorganic sorptive particles within the range of from about 100 to about 400 mesh Tyler screen size and having adhered to the surface thereof a sorptive silica gel, said silica gel being formed in situ in the presence of said inorganic particles to adhere to the surface thereof and constituting greater than 0.1 percent of the total weight of the coated particles and said composition having a packed bulk density from about 15 to about 100 lbs/feet$^3$.

4. The composition of claim 1 in which said inorganic particles are selected from the group consisting of diatomaceous earth, bentonites, sub-bentonites, montmorillonites, pyrophyllite, fuller's earth, silica flour, carbon and perlite.

5. The composition of claim 1 in which said sorptive silica gel constitutes at least about 0.2 weight percent of the total weight of said composition.

6. The composition of claim 1 in which said sorptive silica gel is a silica hydrogel.

7. The composition of claim 1 in which said composition has a packed bulk density of from about 20 to about 30 pounds/cubic foot.

8. The composition of claim 1 in which said inorganic particles are diatomaceous earth.

9. The composition of claim 3 in which said composition has a packed bulk density of from about 20 to about 30 pounds/cubic foot.

* * * * *